US009381719B2

(12) United States Patent
Defoort et al.

(10) Patent No.: US 9,381,719 B2
(45) Date of Patent: Jul. 5, 2016

(54) ASSEMBLY OF PREPREGS FOR PRODUCING STRUCTURES, FOR EXAMPLE ONES WHICH DEPLOY THROUGH INFLATION (75) Inventors: Brigitte Defoort, Saint Medard en Jalles (FR); Dominique Lacour, Tresses (FR); Olivier Le-Couls, Saint Medard en Jalles (FR)

(73) Assignee: ASTRIUM SAS, Paris (FR)

( * ) Notice: Subject to any disclaimer, the term of this patent is extended or adjusted under 35 U.S.C. 154(b) by 1181 days.

(21) Appl. No.: 12/305,656

(22) PCT Filed: Jul. 10, 2007

(86) PCT No.: PCT/EP2007/057061
§ 371 (c)(1),
(2), (4) Date: Dec. 19, 2008

(87) PCT Pub. No.: WO2008/006835
PCT Pub. Date: Jan. 17, 2008

(65) Prior Publication Data
US 2010/0166988 A1    Jul. 1, 2010

(30) Foreign Application Priority Data

Jul. 12, 2006 (FR) ...................... 06 52943

(51) Int. Cl.
*B32B 7/04* (2006.01)
*B29C 65/14* (2006.01)
(Continued)

(52) U.S. Cl.
CPC ................ *B32B 7/045* (2013.01); *B29C 65/14* (2013.01); *B29C 65/1496* (2013.01);
(Continued)

(58) Field of Classification Search
CPC .. B29C 65/4845; B29C 66/721; B29C 65/14; B29C 65/1403; B29C 65/1603; B29C 65/1606; B29C 65/1609; B29K 2105/258; B29L 2022/02; B64G 2001/224; B32B 7/045; B32B 7/12; B32B 7/14; Y10T 428/1362; Y10T 428/24802; Y10T 428/24826
USPC ..................... 428/195.1, 198, 196, 197, 36.1; 52/2.11, 2.18; 138/155; 244/158.3, 244/159.4, 159.5; 156/275.1, 275.5, 272.2, 156/272.8, 273.3, 273.5, 290
See application file for complete search history.

(56) References Cited

U.S. PATENT DOCUMENTS 3,144,104 A *   8/1964   Weir et al. ........................ 52/108
3,331,075 A *   7/1967   Moulton ........................ 343/814
(Continued)

FOREIGN PATENT DOCUMENTS

FR          2 876 983          4/2006
WO     WO 2006/024805 A1     3/2006

OTHER PUBLICATIONS

"Inflatable Solar Array Technology", Cadogan, D.P. et al. American Institute of Aeronautics and Astronautics, 1999.*

*Primary Examiner* — Walter B Aughenbaugh
(74) *Attorney, Agent, or Firm* — Oblon, McClelland, Maier & Neustadt, L.L.P.

(57) ABSTRACT

The invention relates to a method of assembling pre-impregnated plies by local isolated polymerization of the assembly region (30) under the action of a radiation to which the resin of the prepreg is sensitive.
The assembly method makes it possible in particular to produce very large sized gossamer structures (7) in the form of a concertina-folded tube which is deployed by injecting pressurized gas once in space then stiffened by polymerization under the effect of the same radiation. The pylon concerned (7) thus comprises two structural elements (10, 20) secured end to end while at the same time maintaining its flexibility and firmness qualities.

15 Claims, 4 Drawing Sheets (51) Int. Cl.
- B29C 65/48 (2006.01)
- B29C 65/00 (2006.01)
- B29C 70/30 (2006.01)
- B29C 70/54 (2006.01)
- B29C 70/86 (2006.01)
- C08G 59/68 (2006.01)
- B29C 35/08 (2006.01)
- B29C 53/30 (2006.01)
- B29K 63/00 (2006.01)
- B29K 105/24 (2006.01)
- B29K 105/00 (2006.01)
- B29L 22/02 (2006.01)
- B29L 31/30 (2006.01)
- B29L 31/60 (2006.01)
- B29L 31/00 (2006.01)
- B64G 1/22 (2006.01)

(52) U.S. Cl.
CPC ............ *B29C 65/48* (2013.01); *B29C 65/4845* (2013.01); *B29C 66/1122* (2013.01); *B29C 66/21* (2013.01); *B29C 66/52241* (2013.01); *B29C 66/721* (2013.01); *B29C 66/72141* (2013.01); *B29C 66/7394* (2013.01); *B29C 70/305* (2013.01); *B29C 70/54* (2013.01); *B29C 70/86* (2013.01); *C08G 59/68* (2013.01); *B29C 35/0894* (2013.01); *B29C 53/30* (2013.01); *B29C 65/1403* (2013.01); *B29C 65/1406* (2013.01); *B29C 65/1409* (2013.01); *B29C 65/1435* (2013.01); *B29C 65/4815* (2013.01); *B29C 66/63* (2013.01); *B29C 66/71* (2013.01); *B29C 66/7212* (2013.01); *B29C 66/73754* (2013.01); *B29C 66/73941* (2013.01); *B29C 2035/0827* (2013.01); *B29K 2063/00* (2013.01); *B29K 2105/243* (2013.01); *B29K 2105/258* (2013.01); *B29L 2022/02* (2013.01); *B29L 2031/3097* (2013.01); *B29L 2031/605* (2013.01); *B29L 2031/703* (2013.01); *B64G 2001/224* (2013.01); *Y10T 156/1049* (2015.01); *Y10T 156/1051* (2015.01); *Y10T 428/13* (2015.01); *Y10T 428/1362* (2015.01); *Y10T 428/2457* (2015.01); *Y10T 428/24479* (2015.01); *Y10T 428/24488* (2015.01); *Y10T 428/24802* (2015.01); *Y10T 428/24826* (2015.01)

(56) References Cited

U.S. PATENT DOCUMENTS

| | | | | |
|---|---|---|---|---|
| 3,765,974 | A * | 10/1973 | Petersik et al. | 156/84 |
| 3,811,633 | A * | 5/1974 | Cummings et al. | 226/172 |
| 3,873,486 | A * | 3/1975 | Drelich | 524/413 |
| 4,566,927 | A * | 1/1986 | Wood | 156/203 |
| 4,770,374 | A * | 9/1988 | Regipa | 244/171.7 |
| 4,781,962 | A * | 11/1988 | Zamarripa et al. | 428/138 |
| 4,818,584 | A * | 4/1989 | Eisenmann | 428/198 |
| 4,935,287 | A * | 6/1990 | Johnson et al. | 428/198 |
| 5,044,579 | A | 9/1991 | Bernasconi et al. | |
| 5,061,545 | A * | 10/1991 | Li et al. | 428/195.1 |
| 5,093,158 | A * | 3/1992 | Li et al. | 427/278 |
| 5,198,281 | A * | 3/1993 | Muzzy et al. | 428/102 |
| 5,311,706 | A * | 5/1994 | Sallee | 52/2.18 |
| 5,580,013 | A * | 12/1996 | Velke | 244/159.5 |
| 5,609,806 | A * | 3/1997 | Walsh et al. | 264/136 |
| 5,660,644 | A | 8/1997 | Clemens | |
| 5,681,645 | A * | 10/1997 | Strack et al. | 428/196 |
| 5,744,557 | A * | 4/1998 | McCormick et al. | 526/171 |
| 5,964,742 | A * | 10/1999 | McCormack et al. | 604/380 |
| 5,990,851 | A * | 11/1999 | Henderson et al. | 343/915 |
| 6,536,712 | B1 * | 3/2003 | Barenett | 244/158.3 |
| 6,568,640 | B1 * | 5/2003 | Barnett | 244/158.3 |
| 6,786,456 | B2 * | 9/2004 | Veal et al. | 244/158.3 |
| 6,846,548 | B2 * | 1/2005 | Harpell et al. | 428/198 |
| 6,920,722 | B2 * | 7/2005 | Brown et al. | 52/108 |
| 7,211,291 | B2 * | 5/2007 | Harpell et al. | 427/180 |
| 7,622,404 | B2 * | 11/2009 | Termonia | 442/134 |
| 7,694,465 | B2 * | 4/2010 | Pryor | 52/108 |
| 7,740,203 | B2 * | 6/2010 | Lacour et al. | 244/158.3 |
| 7,914,723 | B2 * | 3/2011 | Kim et al. | 264/173.1 |
| 8,025,942 | B2 * | 9/2011 | Defoort et al. | 428/35.7 |
| 2002/0016378 | A1 | 2/2002 | Jin et al. | |
| 2009/0169833 | A1 * | 7/2009 | Koon et al. | 428/195.1 |
| 2009/0211188 | A1 * | 8/2009 | Defoort et al. | 52/309.3 |

* cited by examiner

ASSEMBLY OF PREPREGS FOR PRODUCING STRUCTURES, FOR EXAMPLE ONES WHICH DEPLOY THROUGH INFLATION

TECHNICAL FIELD

The invention relates to the assembly of prepregs. The assembly method according to the invention may be applied to the production of structures of large dimension necessitating the connection between different structural elements made of resin, for example "end to end", and/or structures of complex shape necessitating the junction between two elements, for example of different shape if necessary. The invention is based on the local polymerisation by radiation of prepregs to assure an assembly.

In a more specific manner, the assembly according to the invention concerns structures that are folded and, after assembly, the material maintains a flexibility suited to a compact folding.

The invention concerns in particular the production of prepreg based structures, particularly ones capable of being deployed, for example through inflation, in particular for a space use, and which cannot be produced in a single piece.

The invention particularly finds an application in the production on earth of assemblies of sections of tubes that maintain sufficient mechanical strength to withstand the flight environments, and/or inflation and stiffening capabilities in space.

STATE OF THE PRIOR ART

The production of compact and ultra-light devices, suited to being deployed through inflation after being placed in orbit, has been envisaged from the start of the space era.

These devices comprise a set of hollow structures, generally tubular, which consist of thin membranes folded so as to form a concertina and the deployment of which results from their filling by a pressurized gas such as nitrogen, which is stored in an adjoining tank. These structures are thus known as "gossamer structures".

Figure 1:
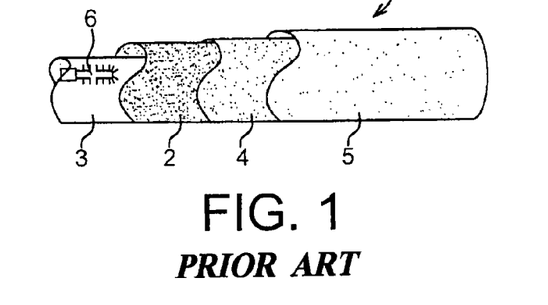

FIG. 1 illustrates in schematic form the type of construction presently retained for a gossamer structure intended to be stiffened by polymerisation of a resin induced by a radiation, and particularly by ultraviolet radiation. Only a portion of the structure has been represented in the deployed state in this figure, so as to clearly show its constituent parts.

A gossamer structure is shown in the form of a tube 1, the wall of which is formed by a flexible membrane which comprises one or several thicknesses of a prepreg fabric 2 of a resin based composition, held in a sandwich between two thin polymer films 3, 4. These films 3, 4 have the function of assuring the impermeability required to inflate the structure and avoid the impregnated fabric 2 bonding to itself when the wall is folded before deployment, which would in fact prevent the deployment of the structure. In the case of a gossamer structure, the polymers constituting the thin films 3, 4 must meet specifications specific to the space field: in particular, the films must be capable of withstanding extreme temperatures and have particularly good mechanical strength properties.

A multilayer thermal cover 5 if necessary completes this sandwich 2, 3, 4.

One of the difficulties posed by the production of gossamer structures is linked to the aggressiveness of the space environment. Indeed, space is full of micrometeorites capable of puncturing any impermeable membrane and thereby giving rise to leaks and a de-inflation, making the deployed structures lose their shape. It is therefore necessary to stiffen them after their deployment, by mechanical, physical or chemical techniques.

In particular, chemical techniques aim to induce, by temperature, ultraviolet or other radiation, etc., the polymerisation of a resin; this polymerisation may be accelerated by catalysts conveyed by the filling gas, except in the case of gossamer structures where an internal impermeable bladder is provided for. In fact, the polymerisation of a resin induced by a radiation would be one of the most interesting ways of stiffening gossamer structures, as regards the reliability of this stiffening technique, the costs of the materials used and their implementation, and the mechanical properties of the stiffened structures.

Thus for example, if the resin of the film 2 is photopolymerisable, the structure 1 moreover comprises a suitable radiation source, for example an ultraviolet lamp, 6 which is arranged inside the tube 1. The photo-polymerisable resin based composition 2 comprises in this case, apart from a reactive oligomer corresponding to the base molecule of the resin, at least one photo-initiator sensitive to the radiation concerned, in other words a compound that decomposes when it is exposed to it to produce chemical species, the role of which is to initiate the polymerisation of the resin.

A preferred route is polymerisation by visible light: a particularly suitable membrane is described in document FR 2 876 983.

However, the production of structures of large size poses a problem. Indeed, the dimension of the raw materials, namely the films 2, 3, 4, available is limited. Moreover, the shaping of films in order to produce the final part requires manufacturing tools, in particular, for a gossamer structure 1, degassing mandrels for folding in concertina shape; these tools have to remain within size and weight criteria compatible with their handling and their reliability: a too high deflection of the mandrel is advised against.

To produce such structures, it thus appears necessary to assemble several structural elements, for example two portions of tube end to end.

The first envisaged technique concerns the bonding of two portions. However, the use of a third material is problematic, especially in the space field: the adhesive must be fully compatible with the films 2, 3, 4; it must maintain the impermeability of the structure and also do this during the folding, deployment, stiffening, and the mechanical action-effects inherent in the use of the structure, and do this at the level of a circumference of the pylon 1. In particular, a non polymerised material of prepreg ply type 2 is not easy to bond.

More generally, this problem of assembly is posed for any complex structure, of the type involving formation of a sphere from flat plies, tube/flat or tube/sphere assembly, or formation of a multiple tube structure, etc.

DESCRIPTION OF THE INVENTION

The invention proposes, under one of its aspects, making up for the drawbacks of existing assembly techniques.

The invention therefore has the objective of defining a method of assembling prepreg fabrics, which makes it possible:
  to assure a sufficient mechanical strength of the bond for manipulations, close to the strength of the initial prepreg,
  while at the same time maintaining the initial flexibility of the prepreg,
  while being compatible with a folding, and without deteriorating the properties of the impregnation resin of the prepreg.

A second objective of the invention is to enable the production of parts of very large dimensions for inflatable structures, which requires that the bond also withstands the inflation forces, in other words the strength of the tube in the inflated state, before its stiffening polymerisation.

In its conventional meaning, the term prepreg concerns a material in the form of a sheet of fibre fabric, impregnated by a resin, the polymerisation of which is not completed, for example a resin known as a "B-state resin" when it is thermosetting. Prepregs are then conventionally used to manufacture composites, after which the hardening is completed.

The basic principle of the invention consists in using a prepreg polymerisable at least partially by radiation, in other words capable of locally polymerising without inducing evolution of the adjacent non activated resin. It is then possible to assure an assembly without use of adhesive, by irradiating the liaison zone, if appropriate also heating it. In a surprising manner, an optimisation of the geometry, the surface and the layout of the bonded bond, has made it possible to maintain the flexibility of the bond and has shown a compatibility with a folding.

The invention thus concerns, under one of its aspects, a structure that comprises two prepreg elements secured to each other in a junction zone. The junction zone is characterised by the superposition of two prepregs that remain independent with the exception of discrete points where the two prepregs are welded to each other, by local cross-linking or polymerisation.

Advantageously, the junction zone is composed of at least two parallel assembly strips spanning the structure, in other words for example over a width or a perimeter of the prepreg depending on the geometry of the structure, separated from each other by a zone in which the two prepregs are uniquely superimposed; each of the strips comprises discrete points of crossed polymerisation of the two prepregs. Thus, the zone between the strips keeps its flexibility and enables in particular a folding; according to the geometry of the folding, there may be a plurality of single superposition zones that cross each other, with a variable pattern.

The geometry of the discrete points is preferably such that the projection on an edge of the junction zone of these discrete points forms a continuous line. In the case where several assembly strips are present, preferably, continuous lines are formed by the projection on the edge of each strip of its discrete points. Advantageously, in order to keep a large amount of flexibility in the assembly, the projection on the edge of each strip only comprises a single point.

Thus, the structure according to the invention may comprise fold zones, for example to form a concertina, in particular a fold in each junction zone.

For example, the structure is an inflatable tubular element, capable of being deployed in space and comprises suitable ancillaries, in particular end bases. The structure according to the invention may also comprise a protective film above two portions of prepreg, and/or a protective film on the other face. One of the films particularly may be impermeable.

The prepreg according to the invention comprises advantageously an epoxy or epoxy-acrylate resin, and a photo-initiator, chosen among iron-arene complex salts of general formula (I) in which A represents an arene group, whereas X represents a non nucleophilic anion:

(I)

Under another aspect, the invention concerns an assembly method that makes it possible in particular to produce a structure as described previously. The assembly method according to the invention comprises the local superposition of two elements comprising a prepreg, then the irradiation in discrete points of the superposition zone in order to carry out a local polymerisation in a junction zone. The irradiation is adapted to the nature of the resin composing the prepreg: in particular, the structures comprise an epoxy or epoxy-acrylate resin and a photo-initiator chosen among iron-arene complex salts of formula (I), wherein the irradiation is carried out by means of a visible light.

Advantageously, the method is carried out for the assembly of tubular structures, and through the intermediary of a mask. The mask comprises the geometry adapted to the desired schema of discrete junction points.

According to a preferred embodiment, the assembly method is integrated in the method of forming a gossamer type structure. In particular, the assembly method is carried out after the first structural element has been coupled to its base, then folded, in order to be able to extend the tube by a second structural element. Once the assembly is formed, there may be folding of the second part of the tubular structure.

Under another aspect, the invention concerns a polymerisation mask adapted to the previous method. Preferably, the mask is composed of at least two irradiation parts, advantageously in the form of strips, separated from each other by an opaque part. Each irradiation strip comprises a number of discrete points localised in a more or less random manner on its surface. Preferably, the projection on one of the sides of the strip of discrete points forms a continuous line; this projection is advantageously such that only one point is present at each time.

The mask may contain several opaque strips that cross each other so as to form non polymerised zones, the pattern of which depends, for example, on a subsequent folding.

The invention finally concerns a space deployment pylon, produced by the previous method with the predefined mask.

BRIEF DESCRIPTION OF DRAWINGS

The characteristics and advantages of the invention will be better understood on reading the description that follows and by referring to the appended drawings, given by way of indication and in no way limiting.

FIG. 1, already described, schematically illustrates a gossamer structure, in deployed and opened out position.

DETAILED DESCRIPTION OF SPECIFIC EMBODIMENTS

Although described hereafter for the production of an inflatable tubular structure for space use, evidently this embodiment is only illustrative. The assembly according to the invention may be applied to all cases where it is wished to produce composite structures, of very large size, planar or tubular or spherical or composed of different elements of same shape or not, folded or not.

Figure 2:
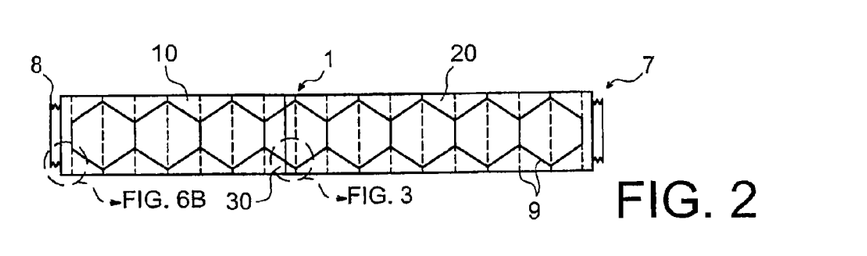
FIG. 2 shows a deployment pylon according to a preferred embodiment of the invention.

The structure concerns for example a space deployment pylon 7 that can attain more than 10 m length with an internal diameter of 160 mm, illustrated in FIG. 2. The pylon 7 is shown in the form of a thin wall tube 1 secured at each end to a base element 8, usually in aluminium alloy; the pylon 7 forms a concertina along the fold zones 9 for the launch then is deployed through inflation once in space. The material of the walls of a pylon 7 of this type must withstand a tractive force of 2.4 N/mm for an internal pressure of 300 mbar.

According to a preferred embodiment, the walls of the inflatable tube 1 may in particular consist of:

- an internal bladder 3, for example in Kapton® our in Upilex®, assuring impermeability to the inflation gas, particularly nitrogen;
- one or several plies 2 of glass/resin composite, two in the preferred context, which will give, after polymerisation, its stiffness to the wall;
- an external membrane 4, for example in aluminised Kapton®.

In particular, and according to the preferred embodiment, the plies 2 of composite are prepregs fabrics composed of a material such as described in FR 2876983. In particular, an epoxy resin, for example of DER 330™ or DER 332™ type, is coupled with a cyclopentadienyl 1-methyl-naphthalene ferrocenium hexafluorophosphate photo-initiator of formula II:

A cyclopentadienyl benzene ferrocenium hexafluorophosphate (formulae III or IV) may also be recommended.

III:

IV:

It is obviously also possible to use a composite polymerisable at least partially by ultraviolet, the resin of which is for example acrylate and the photo-initiator sensitive to UV.

The formation of the pylon 7, in particular the folding 9 according to a suitable pattern, necessitates a specific tooling, which cannot attain this length of 10 m. Thus, the pylon 7 is separated into a first structural element 10 and a second structural element 20, which are advantageously of identical nature, by a junction zone 30.

Figure 3:
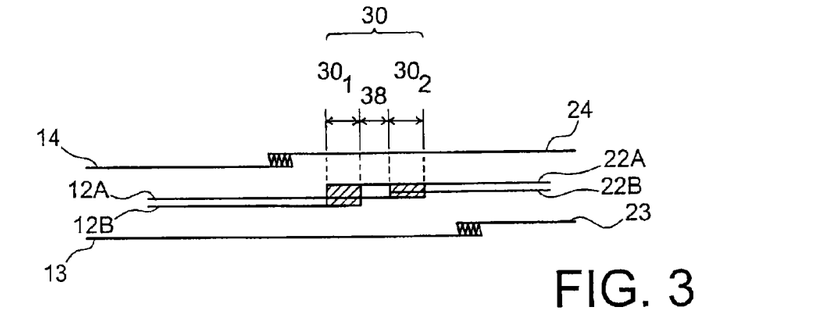
FIG. 3 illustrates the assembly zone by a method according to the invention.

To form the assembly according to the invention, in order to reduce the fragility zone and avoid too high increased thicknesses, it is preferable to carry out a "stepped" junction at the level of the different films of the structure and illustrated in FIG. 3. In particular, at the level of the end of the first element 10, the internal film 13 extends beyond the composite plies 12 which themselves extend beyond the external film 14; naturally any other configuration would be possible, depending on the nature of the assembly and the number of plies 2. The same inverse geometry is found on the second element 20 which will be assembled end to end with the first, so that there is a partial two by two overlapping of each of the films.

The junction between the external films 14, 24 and the internal films 13, 23 may be formed in a conventional manner, particularly by a suitable bonding or a thermal melting. The width of the superposition of each of these films between the two structural elements 10, 20 is dimensioned according to known criteria, so as to carry out this bonding, for example over 10 mm.

As regards the composite plies 12, 22, a bonded assembly poses difficulties, due to the non polymerisation of the component, and in particular due to the stresses that are concentrated there during the deployment.

Usually, another assembly technique between two prepreg plies 2 is carried out by polymerisation such that the impregnation resin plays in some way the role of adhesive between the different plies: it is in this way that the stacks are formed. However, this technology is automatically accompanied by the stiffening of the assembly, and cannot be applied to a gossamer structure.

According to the invention, an isolated polymerisation is used that leaves sufficient space between the polymerised points in order for the prepregs to maintain all their flexibility.

This possibility is offered by the choice of an impregnation resin sensitive to a radiation, in particular to light; as a consequence, the prepreg comprises a photosensitive resin that may be cured and enables the stiffening of the structure once inflated. In particular, the prepreg comprises advantageously an epoxy or epoxy-acrylate resin, and a photo-initiator, chosen among iron-arene complex salts of general formula (I) in which A represents an arene group, whereas X represents a non nucleophilic anion:

(I)

the preferred material comprises an epoxy resin with cyclopentadienyl benzene ferrocenium hexafluorophosphate or cyclopentadienyl 1-methyl-naphthalene ferrocenium hexafluorophosphate.

The chemical nature of the prepreg thereby offers the possibility of a local cross-linking of the composite material. This local polymerisation, carried out by means of a radiation selected as a function of the prepreg, enables a cohesion between the two layers of resin, a perfectly localised "welded" bond and which does not extend to the non irradiated zones.

Figure 4:
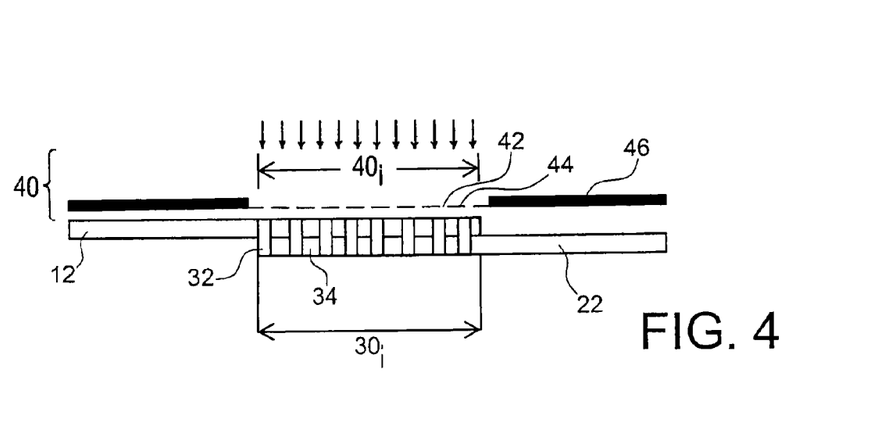
FIG. 4 represents the assembly method according to the invention.

The principle according to the invention is schematised in FIG. 4: the first ply 12 and the second ply 22, manufactured in prepreg material, in other words their resin is not polymerised, are locally superimposed in a junction zone 30; a pressure is applied for a good contact. Above the junction, a mask 40 with a specific pattern comprising irradiation parts 42 and opaque parts 44 is locally applied. The whole is then irradiated, by light within the context of a photosensitive resin partially as described previously. According to the pattern of the mask 40, if necessary by additional heating, there will be polymerisation of specific points 32, and cohesion of two opposite plies, whereas between two welding points 32, which correspond to the opaque parts 44 of the mask 40, the two plies 12, 22 do not interact and form a simple superposition 34. Advantageously, in order to avoid any start of stiffening, the mask 40 is extended by an opaque protection 46 which makes it possible to ensure that the irradiation only concerns the welding points 32.

For reasons of firmness, although isolated, the polymerisation preferably maintains a continuity at the junction zone 30. On the other hand, to maintain its flexibility during the assembly, the points 32, which are stiffened, must remain sufficiently small and distant from each other. In order to produce this type of assembly for a gossamer structure, the junction zone 30 between the two composite plies 12, 22 is provided to be sufficiently extended so that the points 32 can be disseminated in a manner distant from each other, in other words distant by at least the size of their neighbour.

It has been noted that, for a composite such as described above, polymerisation points 32 of around 4 mm diameter may easily be obtained, while at the same time maintaining their function during the inflation, and a relative flexibility of the sheets when they are sufficiently distant to each other.

Given that the junction zone 30 may be relatively extended and to assure the bond, it is preferable to form a junction in two parts, between which it is possible to carry out for example a folding. In particular, according to an advantageous embodiment, the junction zone 30 may be separated into three parallel strips, a first assembly strip $30_1$, an intermediate strip 38 in which the composite plies 12, 22 are juxtaposed and non bound, in other words maintaining all their flexibility, and a second assembly strip $30_2$.

The folding of a structure may moreover be complicated. For example, for a pylon 7 illustrated in FIG. 2, the fold lines may form chopped off hexagons; according to other geometries, other more or less complex patterns may be envisaged. The junction zone 30 may in these cases provide for other "intermediate strips" intended to form the zones where a fold will be made, the strips 38 may cross each other in varied patterns.

Moreover, if the composite plies 12, 22 are formed from several films, and particularly two as illustrated in FIG. 3, it is advantageous to carry out a stepping between the different films, with in particular a cross over: the external ply 22A of the second structural element 20 is welded on its end part to the external ply 12A and internal ply 12B of the first structural element 10, and the internal ply 12B of the first structural element 10 is secured on its end part to the external ply 22A and internal ply 22B of the second structural element 20. One of the intermediate strips 38 then comprises the superposition uniquely of the external plies 12A, 22A of the two structural elements 10, 20.

According to the preferred embodiment described above, a junction zone 30 of 74 mm is thus provided for between the composite plies 12, 22, with a first assembly strip $30_1$ of 32 mm, an intermediate strip 38 of 10 mm, and a second assembly strip $30_2$ of 32 mm. For the provided diameter of 160 mm, each strip $30_1$, 38, $30_2$ has a length of 126 mm.

Figure 5:
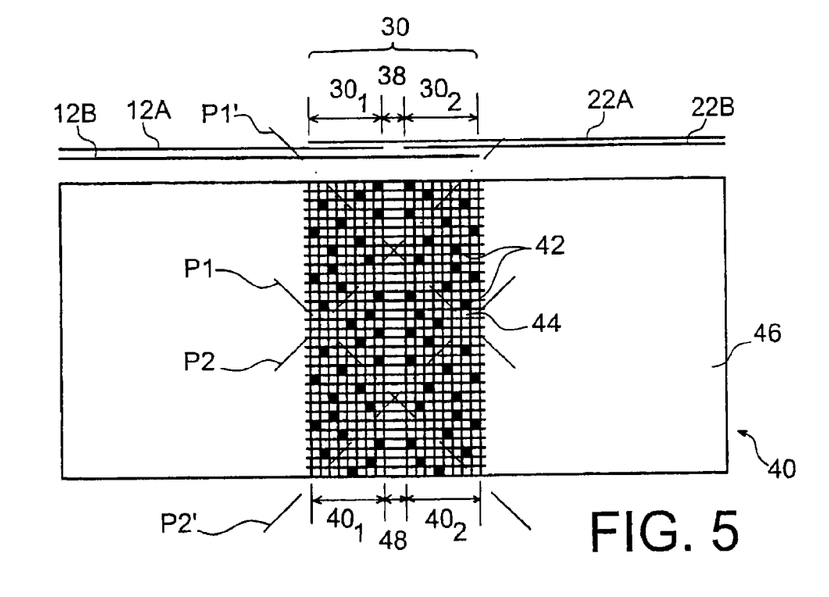
FIG. 5 shows an assembly polymerisation mask according to a preferred embodiment of the invention.

A schema for a suitable polymerisation mask 40 is illustrated in FIG. 5: the irradiation strips $40_1$, $40_2$ are thus "cross-hatched" over a width of eight possible irradiation points. Over each width, a single irradiation point 42 will enable the polymerisation, in order to maintain as far as possible the flexibility of the junction zone 30, the points 42 moreover being randomly distributed so as to be masked or not by light.

More generally, according to a preferred embodiment of the invention, the polymerisation is carried out in a localised and discrete manner on an assembly strip $30_i$ of a predefined width and of length spanning the two composite plies 12, 22 to be assembled. The junction zone 30 is divided into a cross-hatch of welding points 32 in the longitudinal and lateral directions. The mask 40 is patterned in such a way that the projection in the direction of the length on the edge of the irradiation strip $40_i$ of all the parts 42 that are polymerised form a continuous line. Advantageously, only one parts 42 over the width will enable the polymerisation, in order to stiffen the structure as little as possible.

In particular with a view to security, it may be advantageous to double up this configuration, with formation on the mask 40 of two irradiation strips $40_1$, $40_2$, identical or symmetrical or other, separated between each other by a part 48 an opaque strip 48 to the activation radiation of the resin, of width depending on the use of the corresponding intermediate strip 38 on the assembly, in particular sufficient to enable a folding, and 10 mm in the preferred embodiment.

Moreover, as described above, apart from the opaque strip 48, the mask 40 may comprise other opaque parts forming strips where a fold is provided for. Thus, as illustrated in FIG. 5, a "square" fold is envisaged, and the mask 40 is conceived with crossed strips intended to form the folds P1, P1', P2, P2'. A schema to form the pattern of FIG. 2 is naturally also envisaged and part of the invention. A mask according to the invention thus comprises a plurality of irradiation strips separated by opaque strips, said opaque strips forming a predefined and optimised schema.

One embodiment of a pylon 7 according to the invention is thus schematised in FIG. 6.

In a first step (FIG. 6A), the different films of material (namely internal film 13, composite plies 12A, 12B, and external film 14) are wound round a mandrel 50; their cylindrical formation is carried out as is usual in this field, by bonding for example or by a method according to the invention. The mandrel 50 advantageously comprises perforations 52 that will enable a degassing.

Figure 6A:
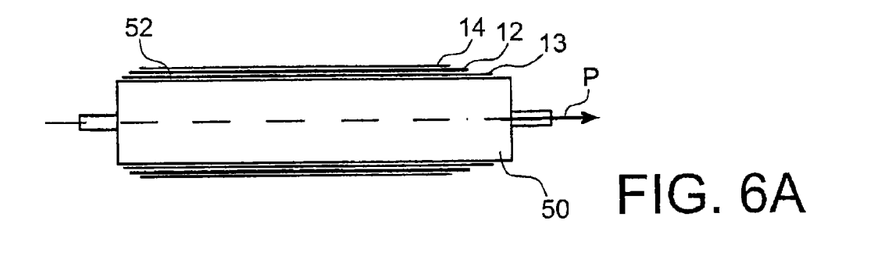
FIGS. 6A to 6F describe a method for producing a deployment pylon according to one embodiment of the invention.
Figure 6B:
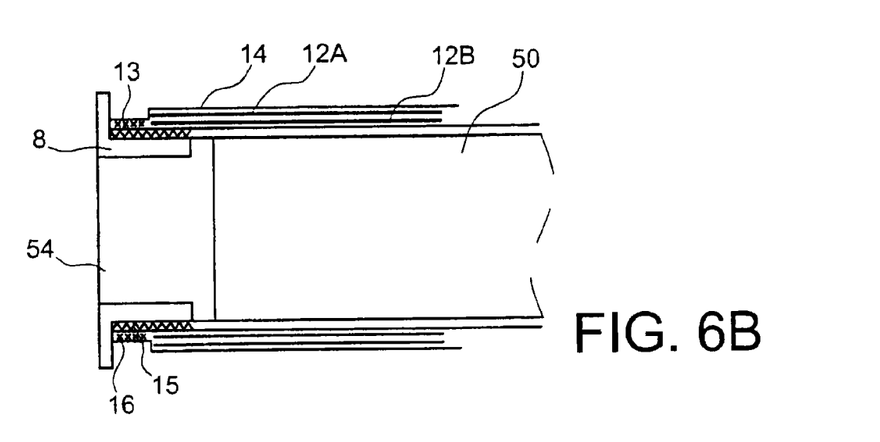

In a second step, the first end of the pylon 7 is formed, by integration with a first base element 8, preferably in aluminium alloy: FIG. 6B. As is normal, an integration tool 54 is coupled to the mandrel 50; the films of material 12, 13, 14 are arranged so that the external film 14 and internal film 13, intended for the securement on the base 8, form a protuberance in relation to the composite plies 12. A bonding of the internal film 13 is then carried out on the first base element 8, and the external film 14 on the internal film 13, by exercising a pressure on the chosen adhesive 15 or by forming a thermal weld 16.

Figures 6C, 6D:
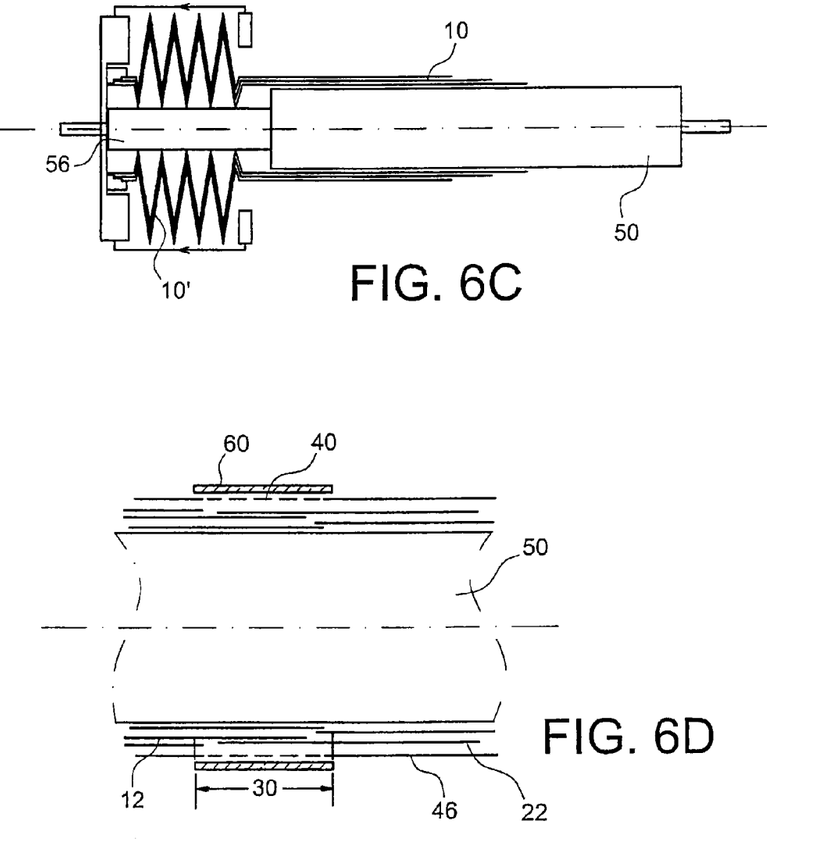
Figure 6E:
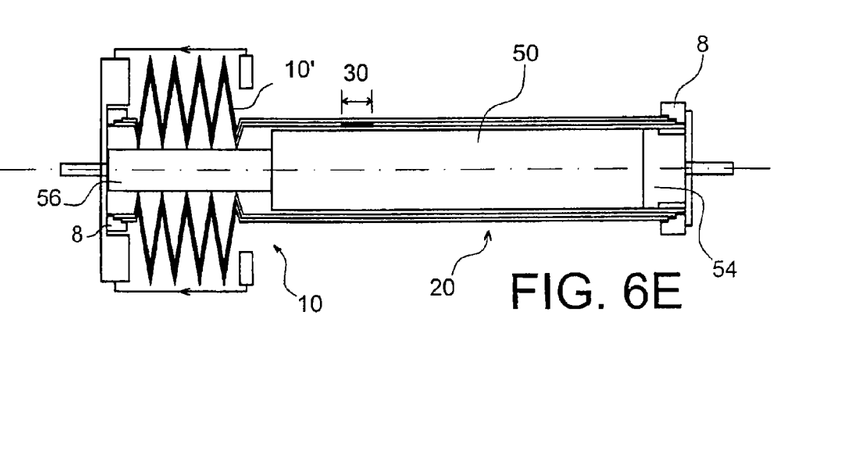

In a third step illustrated in FIG. 6C, the assembly of films 12, 13, 14 is folded, as normal, and withdrawn from mandrel 50. A vacuum may be applied via perforations 52, so as to lay the internal layer 13 flat on the mandrel 50.

A first base element 8 of pylon 7 is therefore obtained, which is coupled to a concertina 10' of composite structure, advantageously stowed around a square stowage tool 56. One end of the composite structure 10' remains however non folded and around the mandrel 50. Usually, this end would be coupled to the second base element of the pylon 7.

Within the scope of the invention, it is wished to form a longer pylon. An assembly of this non folded part with a second structural element 20 of similar nature to the first is then carried out. The second structural element 20 is positioned around the mandrel 50, on the side opposite to the first, with a partial overlapping junction zone 30 between the different layers of the two structural elements 10, 20: FIG. 6D. As has been made clear above, it is preferable that this overlapping is carried out in a stepped manner.

In order to form the assembly, at the level of the junction zone 30, an irradiation mask 40, for example that of FIG. 5, is positioned, preferably associated with a light protective layer 46 on the sides of the mask 40, in order to be sure to only polymerise, if necessary partially, the resin on the points previously defined 32. The junction zone 30 is irradiated through the mask 40, for example by means of a visible light electroluminescent panel 60. If the resin so requires, the polymerisation may be completed by a heat treatment.

Advantageously, the internal film 13 and the external film 14 are themselves also partially assembled by means of heat.

An assembly is thereby obtained composed of a first structural element 10 secured at one end to a pylon base 8, then concertina-folded 10', then wound round the mandrel 50, and a second structural element 20 wound round the mandrel 50, wherein the first and second elements 10, 20 are superimposed at the level of a junction zone 30 where they are partially joined.

It is then possible to continue the folding, in a continuous manner with the folding of the first structural element 10, and in particular by positioning a fold at the level of the non polymerised zone (the intermediate strip 38) between the two assembly strips 30₁, 30₂, as well as at the level of other non polymerised zones stemming from the strips P1, P1', P2, P2'.

Figure 6F:
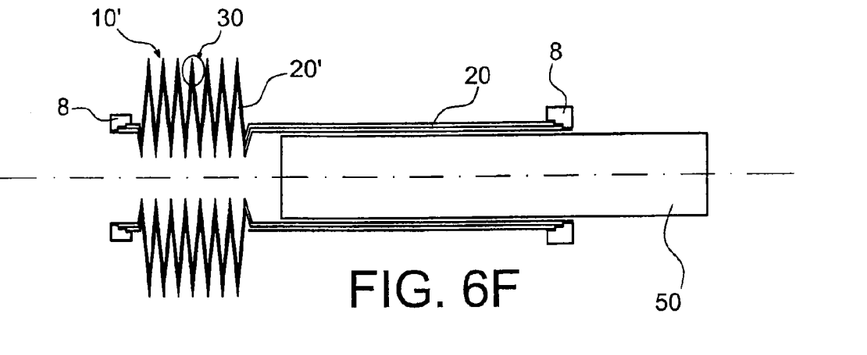

In the case of a pylon 7 composed of two structural elements 10, 20, in particular a pylon of ten or so meters, the exterior end of the second element is incorporated in a base 8 (FIG. 6E), before carrying out the folding (FIG. 6F).

Tests have shown that this embodiment makes it possible to obtain a pylon 7 that meets the conditions required for space use as is known. Moreover, no adaptation of the material normally used has been necessary: the pylons 7 have been folded and deployed using the normal tools, in particular TADECS. No influence of the junction zone 30 has been observed during folding, or during deployment. The behaviour of the pylon produced according to the previous embodiment has not been different to that of a "normal" single pylon, just as the profile of inflation by pressure has not been modified. Above all, no damage has been observed on the pylon 7 itself at the level of the junction zone 30. In fact, the bonding of the external film 14, 24 is the only visible sign that a junction between two separate structural elements 10, 20 has been carried out.

The method according to the invention therefore completely meets requirements in the aerospace field. It enables in particular a pylon of unlimited length to be produced, without increasing the costs of the material.

Naturally, it is possible to envisage the junction of several elements end to end, in order to produce an even longer structure. Moreover, although described herein with a resin at least partially photosensitive to light for an inflatable gossamer structure, other embodiments are possible: the assembly method according to the invention enables an impermeable junction, without addition of material, on prepregs, while at the same time maintaining their future flexibility and polymerisation characteristics. In particular, several steps of the method described are naturally not obligatory: the emplacement of end bases obviously only concerns the production of gossamer type deployment structures.

Although described around a mandrel placed under vacuum, the presence of the latter is not indispensable. In particular, the objective of the mandrel is to facilitate the folding of the tube. This concerns the previous structure, or more generally a concertina structure. The assembly method according to the invention may naturally be used with a folding being provided for.

The method is likewise not limited to assembly between two portions of tube: it is possible to weld together two flat structural elements. Which is why the bonding of external and internal plastic films, in order to produce this tubular structure, has not been described, since it is known to those skilled in the art: the only requirement is that the adhesive used is compatible with a use in space, and in particular, it must not degas under vacuum.

Figure 7A:
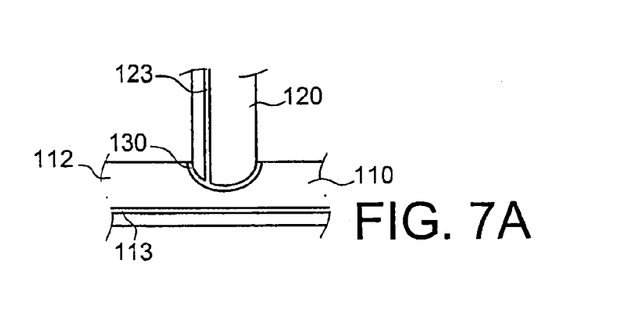
FIGS. 7A to 7C show other structures obtained by assembly according to the invention.

It is however possible, as illustrated in FIG. 7A, to use an assembly according to the invention also to enclose a tubular structure 110: a flat prepreg 112 may be "closed" over itself and the superposition edge 113 is welded by an assembly method according to the invention.

FIG. 7A further illustrates a complex structure that may be produced by a method according to the invention: a first tubular structure 110 is coupled to a second tubular structure 120 in order to form a T (or any other angle other than 90°, or instead to form a Y); the second tubular structure 120 may also have been formed from a flat ply welded by the previous local polymerisation 123. The junction zone 130 is formed by a method according to the invention. Naturally, it is possible to double up this configuration, to obtain an X, or any other shape.

Figure 7B:
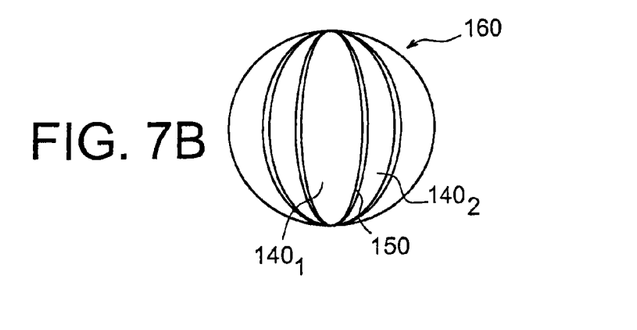
Figure 7C:
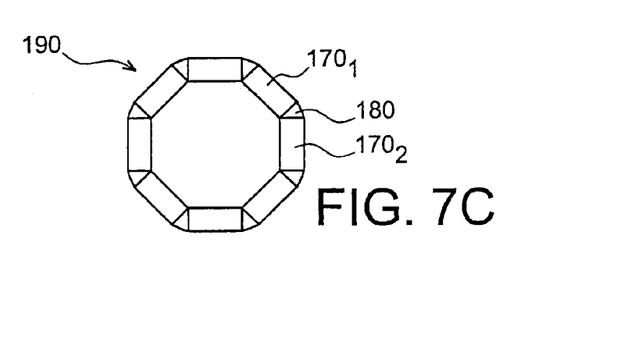

More generally, the method according to the invention makes to possible to produce any structure, once the junction zone, if necessary the fold zone, enables the definition of a suitable polymerisation mask. In particular, as illustrated in FIG. 7B, it is possible to assemble flat prepreg elements $140_1$, $140_2$, etc. by junction zones 150 and thereby form a spherical structure 160. The assembly of tubes 170, (e.g., $170_1$ and $170_2$) end to end by a junction zone 180 can enable, apart from the formation of a pylon, the formation of a torus type closed structure 190 illustrated in FIG. 7C, by way of example.

Even though, in the case of thin structures, polymerisation by light or UV is sufficient, for structures up to several centimeters thick, it may be preferable to use a polymerisation by electrons, with all known intermediate technologies (X-rays in particular). This falls within the scope of the assembly according to the invention.

Advantageously however, the products produced according to the invention are used in particular to manufacture radars, solar panels, reflectors, sun shades, antennae, mirrors or solar sail type devices, intended to equip orbital devices such as satellites, telescopes or orbital stations, or space or planetary exploration devices such as probes or robots.

The invention claimed is:

1. A method of assembling a first structural element comprising a first prepreg ply extending in a first direction and a second structural element comprising a second prepreg ply extending in the first direction, the method comprising:
   superimposing the first prepreg ply of the first structural element and the second prepreg ply of the second structural element to form a junction zone, wherein the junction zone comprises:
      a first assembly strip having a width W1 in the first direction and a length L1 in a second direction, which is perpendicular to the first direction;
      a second assembly strip having a width W2 in the first direction and a length L2 in the second direction; and
      an intermediate strip, which separates the first assembly strip and the second assembly strip; and
   irradiating discrete points of the first assembly strip and the second assembly strip with visible light, UV light, or electrons, thereby locally cross polymerizing and bonding the first and second prepregs at the discrete points in the first and second assembly strips,
   wherein the first and second prepregs are at least partially polymerizable under a predetermined radiation and are not polymerized and remain juxtaposed in the intermediate strip,
   wherein the discrete points in the first assembly strip are arranged such that:
      projections of each of the discrete points in the first assembly strip, in the first direction, onto an imaginary line extending along the length L1 forms a continuous line C1 along the entire length of the imaginary line extending along the length L1, wherein at each location along the continuous line C1 a single discrete point projects onto the continuous line C1 from the first assembly strip; and
      projections of each of the discrete points in the first assembly strip, in the second direction, onto an imaginary line extending along the width W1 forms a continuous line C1' along the entire width of the imaginary line extending along the width W1,
   wherein the discrete points in the second assembly strip are arranged such that:
      projections of each of the discrete points in the second assembly strip, in the first direction, onto an imaginary line extending along the length L2 forms a continuous line C2 along the entire length of the imaginary line extending along the length L2, wherein at each location along the continuous line C2 a single discrete point projects onto the continuous line C2 from the second assembly strip; and
      projections of each of the discrete points in the second assembly strip, in the second direction, onto an imaginary line extending along the width W2 forms a continuous line C2' along the entire width of the imaginary line extending along the width W1.

2. The method of claim 1, further comprising:
   placing a mask comprising an opaque part and a part enabling the passage of the radiation on the junction zone prior to the irradiation; and then
   irradiating through the mask, thereby cross polymerizing the discrete points,
   wherein the discrete points have a geometry of the mask.

3. The method of claim 1, wherein the irradiating is carried out with light, and the first and second prepregs comprise a fibrous material impregnated with a composition comprising:
   an epoxy or epoxy-acrylate resin; and
   a photo-initiator,
   wherein the photo-initiator is an iron-arene complex salt of formula (I):

wherein:
   A is an arene group; and
   X is a non nucleophilic anion.

4. The method of claim 1, wherein the first structural element further comprises a first film on a face of the first prepreg ply and the second structural element further comprises a second film on a face of the second prepreg ply, wherein the first and second film are each transparent to the radiation.

5. The method of claim 1, wherein the first and second structural elements are tubular and the method further comprises:
   positioning the first element and the second element end to end on a mandrel.

6. The method of claim 1, further comprising, prior to assembly:
   folding an end portion of the first element.

7. The method of claim 1, further comprising, after the assembly:
   folding a non folded part of the first element, the junction zone, and the second element.

8. An inflatable space structure, obtained by a method of assembling a first structural element comprising a first prepreg ply extending in a first direction and a second structural element comprising a second prepreg ply extending in the first direction, the method comprising:
   superimposing the first prepreg ply of the first structural element and the second prepreg ply of the second structural element to form a junction zone, wherein the junction zone is divided into:
      a first assembly strip having a width W1 in the first direction and a length L1 in a second direction, which is perpendicular to the first direction;
      a second assembly strip having a width W2 in the first direction and a length L2 in the second direction; and an intermediate strip, which separates the first assembly strip and the second assembly strip, irradiating discrete points of the first assembly strip and second assembly strip with visible light, UV light, or electrons, thereby locally cross polymerizing and bonding the first and second prepegs at the discrete points in the first and second assembly strips, wherein the first and second prepregs are at least partially polymerizable under a predetermined radiation and are not polymerized and remain juxtaposed in the intermediate strip, wherein the discrete points in the first assembly strip are arranged such that:
  projections of each of the discrete points in the first assembly strip, in the first direction, onto an imaginary line extending along the length L1 forms a continuous line C1 along the entire length of the imaginary line extending along the length L1, wherein at each location along the continuous line C1 a single discrete point projects onto the continuous line C1 from the first assembly strip; and
  projections of each of the discrete points in the first assembly strip, in the second direction, onto an imaginary line extending along the width W1 forms a continuous line C1' along the entire width of the imaginary line extending along the width W1, wherein the discrete points in the second assembly strip are arranged such that:
  projections of each of the discrete points in the second assembly strip, in the first direction, onto an imaginary line extending along the length L2 forms a continuous line C2 along the entire length of the imaginary line extending along the length L2, wherein at each location along the continuous line C2 a single discrete point projects onto the continuous line C2 from the second assembly strip; and
  projections of each of the discrete points in the second assembly strip, in the second direction, onto an imaginary line extending along the width W2 forms a continuous line C2' along the entire width of the imaginary line extending along the width W1.

9. The inflatable space structure of claim 8, wherein the first and second prepregs comprise a fibrous material impregnated with a composition comprising:
  an epoxy or epoxy-acrylate resin; and
  a photo-initiator,
  wherein the photo-initiator is an iron-arene complex salt of formula (I):

(I)

wherein:
  A is an arene group; and
  X is a non nucleophilic anion.

10. A structure, comprising:
  a first element comprising a first prepreg ply extending in a first direction; and
  a second element comprising a second prepreg ply extending in the first direction,
  wherein the first and second prepreg ply are sensitive to a polymerization radiation,
  wherein the first prepreg ply and the second prepreg ply are superimposed to form a junction zone, wherein the junction zone comprises:
    a first assembly strip having a width W1 in the first direction and a length L1 in a second direction, which is perpendicular to the first direction;
    a second assembly strip having a width W2 in the first direction and a length L2 in the second direction; and
    an intermediate zone, which separates the first assembly strip and the second assembly strip,
  wherein the first and second prepregs are bonded together in the first and second assembly strips by irradiating discrete points of the first and second assembly strips with visible light, UV light, or electrons, thereby cross polymerizing and bonding the first and second prepegs at the discrete points in the first and second assembly strips, and wherein the first and second prepegs are juxtaposed without cross-linking polymerization in the intermediate zone,
  wherein the discrete points in the first assembly strip are arranged such that:
    projections of each of the discrete points in the first assembly strip, in the first direction, onto an imaginary line extending along the length L1 forms a continuous line C1 along the entire length of the imaginary line extending along the length L1, wherein at each location along the continuous line C1 a single discrete point projects onto the continuous line C1 from the first assembly strip; and
  projections of each of the discrete points in the first assembly strip, in the second direction, onto an imaginary line extending along the width W1 forms a continuous line C1' along the entire width of the imaginary line extending along the width W1,
  wherein the discrete points in the second assembly strip are arranged such that:
    projections of each of the discrete points in the second assembly strip, in the first direction, onto an imaginary line extending along the length L2 forms a continuous line C2 along the entire length of the imaginary line extending along the length L2, wherein at each location along the continuous line C2 a single discrete point projects onto the continuous line C2 from the second assembly strip; and
    projections of each of the discrete points in the second assembly strip, in the second direction, onto an imaginary line extending along the width W2 forms a continuous line C2' along the entire width of the imaginary line extending along the width W1.

11. The structure of claim 10, wherein the first and second elements are tubular and the junction zone extends over the circumference of a tube.

12. The structure of claim 10, having at least a part that is concertina folded.

13. The structure of claim 10, comprising a fold in the junction zone.

14. An inflatable space manipulation pylon, comprising the structure of claim 10.

15. The structure of claim 10, wherein the first and second prepregs comprise a fibrous material impregnated with a composition comprising:
  an epoxy or epoxy-acrylate resin; and
  a photo-initiator, wherein the photo-initiator is an iron-arene complex salt of formula (I):

(I)

wherein:
A is an arene group; and
X is a non nucleophilic anion.

* * * * *